United States Patent
Karaoguz et al.

(10) Patent No.: US 7,680,133 B2
(45) Date of Patent: *Mar. 16, 2010

(54) SIMULCASTING OR MULTICASTING OF MULTIMEDIA CALL SESSIONS IN A LAN/WLAN/PAN VIA A BROADBAND ACCESS GATEWAY

(75) Inventors: Jeyhan Karaoguz, Irvine, CA (US); James D. Bennett, San Clemente, CA (US); Nambirajan Seshadri, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 779 days.

This patent is subject to a terminal disclaimer.

(21) Appl. No.: 11/093,363

(22) Filed: Mar. 30, 2005

(65) Prior Publication Data

US 2006/0025111 A1 Feb. 2, 2006

Related U.S. Application Data

(60) Provisional application No. 60/591,735, filed on Jul. 28, 2004, provisional application No. 60/591,847, filed on Jul. 28, 2004, provisional application No. 60/591,844, filed on Jul. 28, 2004, provisional application No. 60/591,841, filed on Jul. 28, 2004, provisional application No. 60/591,845, filed on Jul. 28, 2004, provisional application No. 60/591,843, filed on Jul. 28, 2004, provisional application No. 60/591,842, filed on Jul. 28, 2004.

(51) Int. Cl.
*H04L 12/28* (2006.01)
*H04L 12/56* (2006.01)
*H04B 7/00* (2006.01)
*H04B 15/00* (2006.01)

(52) U.S. Cl. .................. 370/401; 370/390; 455/503

(58) Field of Classification Search ................ 370/390
See application file for complete search history.

(56) References Cited

U.S. PATENT DOCUMENTS

| | | | |
|---|---|---|---|
| 6,011,977 A * | 1/2000 | Brown et al. ................ 455/503 |
| 2003/0060221 A1 * | 3/2003 | Eberlein et al. ............. 455/503 |
| 2004/0002330 A1 * | 1/2004 | Chitrapu .................. 455/426.2 |
| 2004/0203792 A1 * | 10/2004 | Shaheen et al. ............. 455/444 |
| 2005/0190747 A1 * | 9/2005 | Sindhwani et al. .......... 370/352 |
| 2005/0254469 A1 * | 11/2005 | Verma et al. ................ 370/338 |
| 2005/0282490 A1 * | 12/2005 | Nurmi ....................... 455/11.1 |
| 2006/0126590 A1 * | 6/2006 | Putcha et al. ............... 370/343 |

* cited by examiner

*Primary Examiner*—William Trost, IV
*Assistant Examiner*—Andrew Chriss
(74) *Attorney, Agent, or Firm*—McAndrews, Held & Malloy

(57) ABSTRACT

A method and system for simulcasting multimedia information via a broadband access gateway and a wireless wide area network, is disclosed. An access device such as, for example, a mobile multimedia handset engaged in a call served by a wireless wide area network may migrate to within the coverage area of an associated broadband access gateway with a wireless interface. The wireless wide area network may simulcast call content to the broadband access gateway via a broadband network. A user in the proximity of the broadband access gateway may be notified of the simulcasting of the call, and may elect to continue the call via a WLAN/PAN-enabled wireless handset or other access device that is compatible with the wired and/or wireless interfaces of the broadband access gateway.

53 Claims, 7 Drawing Sheets

SIMULCASTING OR MULTICASTING OF MULTIMEDIA CALL SESSIONS IN A LAN/WLAN/PAN VIA A BROADBAND ACCESS GATEWAY

RELATED APPLICATIONS

The present application makes reference to, claims priority to, and claims the benefit of the following United States Provisional Patent Applications, the complete subject matter of each of which is hereby incorporated herein by reference, in its entirety.

| Serial No. | Attorney Docket No. | Title | Date Filed |
|---|---|---|---|
| 60/591,735 | 15884US01 BP3837 | Method and System for Handoff Through Simulcasting | Jul. 28, 2004 |
| 60/591,847 | 15885US01 BP3838 | Method and System for Handling Calls Through Simulcasting | Jul. 28, 2004 |
| 60/591,844 | 15886US01 BP3839 | Method and System for Handling Multimedia Information Through Simulcasting | Jul. 28, 2004 |
| 60/591,841 | 15887US01 BP3840 | Method and System for Simulcasting or Multicasting Multimedia Information in a Broadband Wired and/or Wireless LAN or Personal Area Network (PAN) Via a Broadband Access Gateway | Jul. 28, 2004 |
| 60/591,845 | 15888US01 BP3841 | Method and System for Consuming Simulcasted and Multicasted Content in a PAN/WAN/WLAN Serviced by a Broadband Access Gateway | Jul. 28, 2004 |
| 60/591,843 | 15889US01 BP3842 | Method and System for Handoff of a Multimedia Stream by Sniffing | Jul. 28, 2004 |
| 60/591,842 | 15890US01 BP3843 | Method and System for Sniffing to Provide Association with a New Network | Jul. 28, 2004 |

The present application also makes reference to U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

The present application also makes reference to U.S. patent application Ser. No. 11/094,045, entitled "Handling Of Multimedia Call Sessions And Attachments Using Multi-Network Simulcasting", filed Mar. 30, 2005, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

A user of a wireless device that is served by a wireless wide area network may travel to their residence or business during an active call. There may be a conventional switched telephone network station set, a cordless phone, or an Internet protocol (IP) phone available upon their arrival, and the user is typically forced to make a decision to continue the call via the wide area network, incurring wide area network charges for the call, or to interrupt the present wireless call and initiate a new call using the available conventional switched telephone network station set, cordless phone, or Internet protocol (IP) phone. A user of a conventional switched telephone network station set, cordless phone, or Internet protocol phone that must travel from the residence or business while engaged in a call typically is required to interrupt their current call and initiate a new call via a wireless handset served by a wireless wide area network.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method supporting simulcasting of a wide area network call via a broadband access gateway, substantially as shown in and/or described in connection with at least one of the figures, as set forth more completely in the claims."

These and other advantages, aspects and novel features of the present invention, as well as details of an illustrated

DETAILED DESCRIPTION OF THE INVENTION

Aspects of the present invention relate to communication over hybrid wired and wireless networks. More specifically, certain embodiments of the present invention relate to a method and system for simulcasting or multicasting multimedia information in a broadband wired and/or wireless local area network (LAN) or personal area network (PAN) via a broadband access gateway.

An aspect of the invention provides seamless merging of wide area networks (WANs), from any kind of wired and/or wireless wide area networks, to pockets of wired and/or wireless local area networks (WLANs) and personal area network (PANs), which may be located in homes or other environment such as an office or business. The merging of these various types of networks enables transparent communication of all types of media between access devices, which may be wired or wirelessly coupled to one or more of these networks. Seamless communication may be provided to access devices as they transition from one type of network to another type of network. In a representative embodiment of the present invention, a user engaged in a wireless call via wide area network such as, for example, a cellular network, may continue the call using a wireless local area network (WLAN) and/or personal area network (PAN)-enabled wireless handset in communication with a broadband access gateway that exchanges call information simulcasted by the wireless wide area network.

Figure 1:
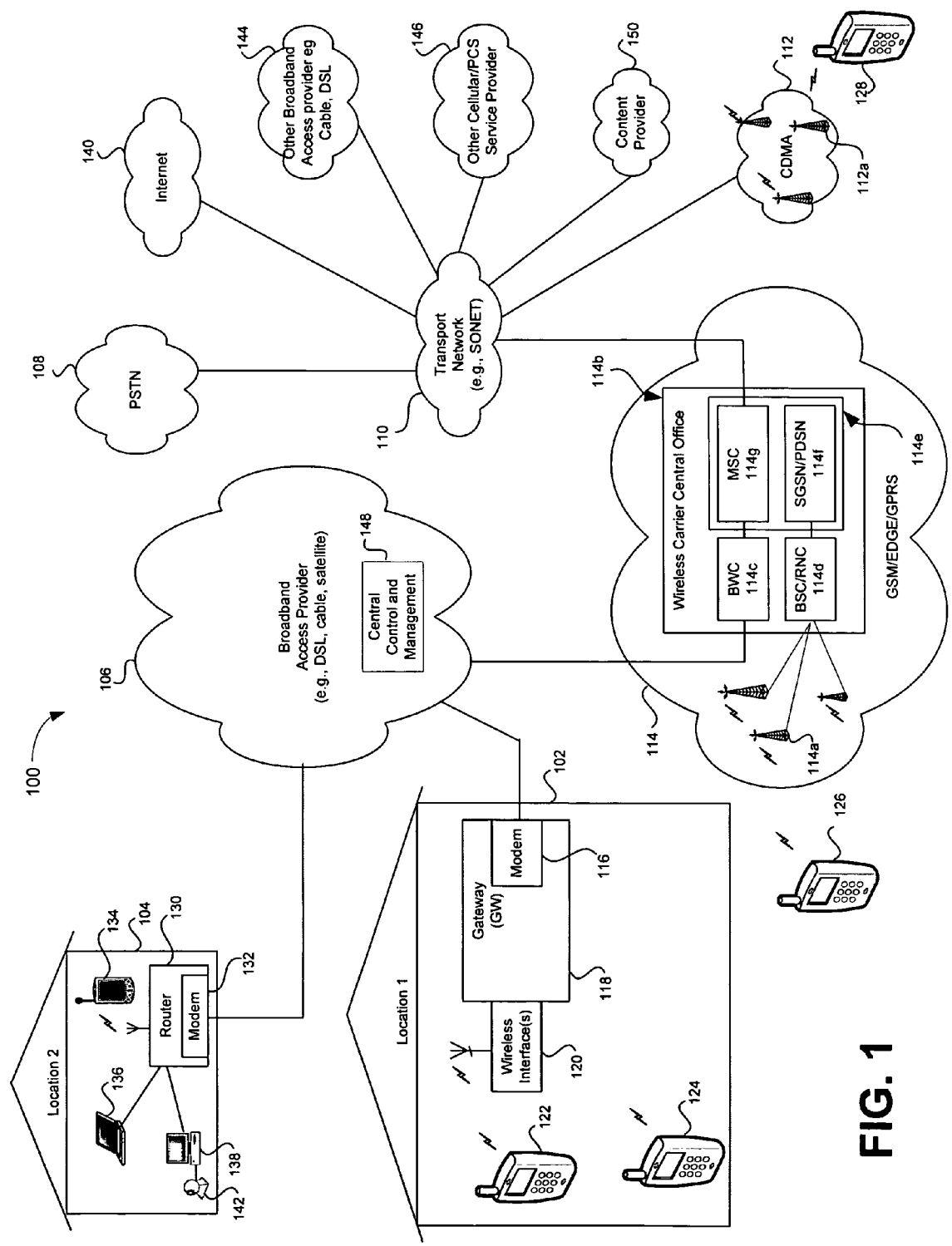
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, a public switched telephone network (PSTN) 108, a transport network 110, wireless service provider networks including a CDMA network 112 and a GSM/EDGE/GPRS network 114, and access devices 122, 124, 126, and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11 a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11 a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning, service management, and accounting. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM/EDGE/GPRS network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM/EDGE/GPRS networks 112, 114 may comprise a plurality of cell sites (a/k/a cellular towers) that are located in geographical cells within each of the networks. Within the GSM/EDGE/GPRS network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM/EDGE/GPRS network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM/EDGE/GPRS network 114 towards the wireless interface 120 in the first location 102, the call may be handed off from the cell site 114a of the GSM/EDGE/GPRS network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM/EDGE/GPRS network 114 via the broadband connection to the BAP 106 which is connected to the broadband wireless local area network controller (BWC) 114c.

In a representative embodiment of the present invention, voice and data traffic related to an existing active wireless call or connection for a subscriber may be routed from a serving wireless service provider such as, for example, the GSM/EDGE/GPRS network 114, to a broadband wired and/or a wireless WAN, LAN, and/or PAN/WLAN using a broadband access gateway so as to provide handoff. The broadband wired and/or wireless WAN, LAN, and/or PAN/WLAN may use a broadband access gateway such as, for example, the wireless interface 120 and the gateway 118 of FIG. 1, and may be located in a home, for example. Simulcasting is the simultaneous broadcasting of the same information over two different communication paths or channels. Accordingly, in a representative embodiment of the present invention, voice and data-related traffic may be simulcasted to an access device such as, for example, the access devices 122, 124, 126, 128 of FIG. 1 and to a home broadband access gateway such as, for example, the gateway 118 upon initiation of a call, in addition to receipt of a call from a calling party. The voice and data-related traffic may comprise multimedia information such as streaming video, broadcast video, digitized voice, digital data, text, digitized audio, digitized still images, digitized video, and digitized music, for example. In the former case where a calling party places a call to a called party, related voice and multimedia information for the called party and/or the calling party may be communicated to the broadband access gateway 118. Once the broadband access gateway 118 receives the related voice and multimedia information, the broadband access gateway 118 may simulcast or multicast the voice and/or multimedia information within the personal area network/wireless local area network serviced by the broadband access gateway 118. In this regard, any of one or more access devices, which may be wired and/or wirelessly coupled to the broadband access gateway 118, may be utilized to consume the multimedia information or provide continued voice communication via the broadband access gateway 118. Accordingly, when the calling party is at home, for example, at location 102, the calling party may use their access device or any other access device that has the capability to communicate with the broadband access gateway for communication within the PAN/WLAN serviced by the broadband access gateway 118.

In an illustrative embodiment of the invention, the broadband access gateway 118 may receive voice and multimedia information simulcasted from, for example, the wireless carrier central office 114b of the GSM/EDGE/GPRS network 114. Upon receiving the simulcasted voice and multimedia information from the wireless carrier central office 114b, the broadband access gateway 118 may simulcast the voice information via, for example, an IEEE 802.11x compatible wireless local area network path and/or a personal area network compatible with, for example, the IEEE 802.15.3a or Bluetooth standards. For example, an owner of the mobile access device 126 may be utilizing the mobile access device 126 for a call with an owner and current user of, for example, the mobile access device 128. In a representative embodiment of the present invention, the simulcasted voice traffic received by the broadband access gateway 118 from the wireless carrier central office 114b via the BAP 106 may also be communicated to a WLAN/PAN-enabled wireless handset (not shown) via the WLAN/PAN supported by the wireless interface 120 of the gateway 118, as the user of the mobile access device 126 migrates within range of the broadband access gateway 118. Hence, if the user of the mobile access device 126 is within operating range of the broadband access gateway 118 and the mobile telephone 126 is low on battery power, the user may utilize a WLAN/PAN-enabled wireless handset within the coverage area of the wireless interface 120 to continue the conversation uninterrupted.

In another representative embodiment of the present invention, an owner of the mobile access device 126 may still be within operating range of the broadband access gateway 118 and may receive a call from the owner and user of mobile access device 128. If the owner of mobile access device 126 cannot readily locate the mobile access device 126, the owner of mobile access device 126 may choose a WLAN/PAN-enabled wireless handset at location 102 to answer the incoming call, since call traffic from the mobile access device 128 is being simulcasted over a second wireless path by the wireless interface 120 of the gateway 118. If the owner of the mobile telephone 126 locates the mobile access device 126, the owner may decide to switch from using the WLAN/PAN-enabled wireless handset to using the mobile access device 126 while still within an operating range of the broadband access gateway 118. However, as the user of the mobile access device 126 migrates from within the operating range of the broadband access gateway 118 to the operating range of, for example, the cell site 114a, the wireless communication service may switch from the broadband access gateway 118, to the wireless wide area network service provider 114 (i.e., the GSM/EDGE/GPRS network 114).

In another representative embodiment of the present invention, the broadband access gateway 118 may have the capability to simulcast or multicast multimedia information that is simulcasted and received from, for example, the GSM/EDGE/GPRS network 114. In this regard, the multimedia information that is simulcasted or multicasted by the broadband access gateway 118 may be simultaneously consumed by one or a plurality of access devices located within the coverage area of the PAN/WLAN serviced by the broadband access gateway 118. For example, the gateway 118 may simulcast multimedia information to a number of WLAN/PAN-enabled wireless handsets (not shown), simultaneously.

Figure 2:
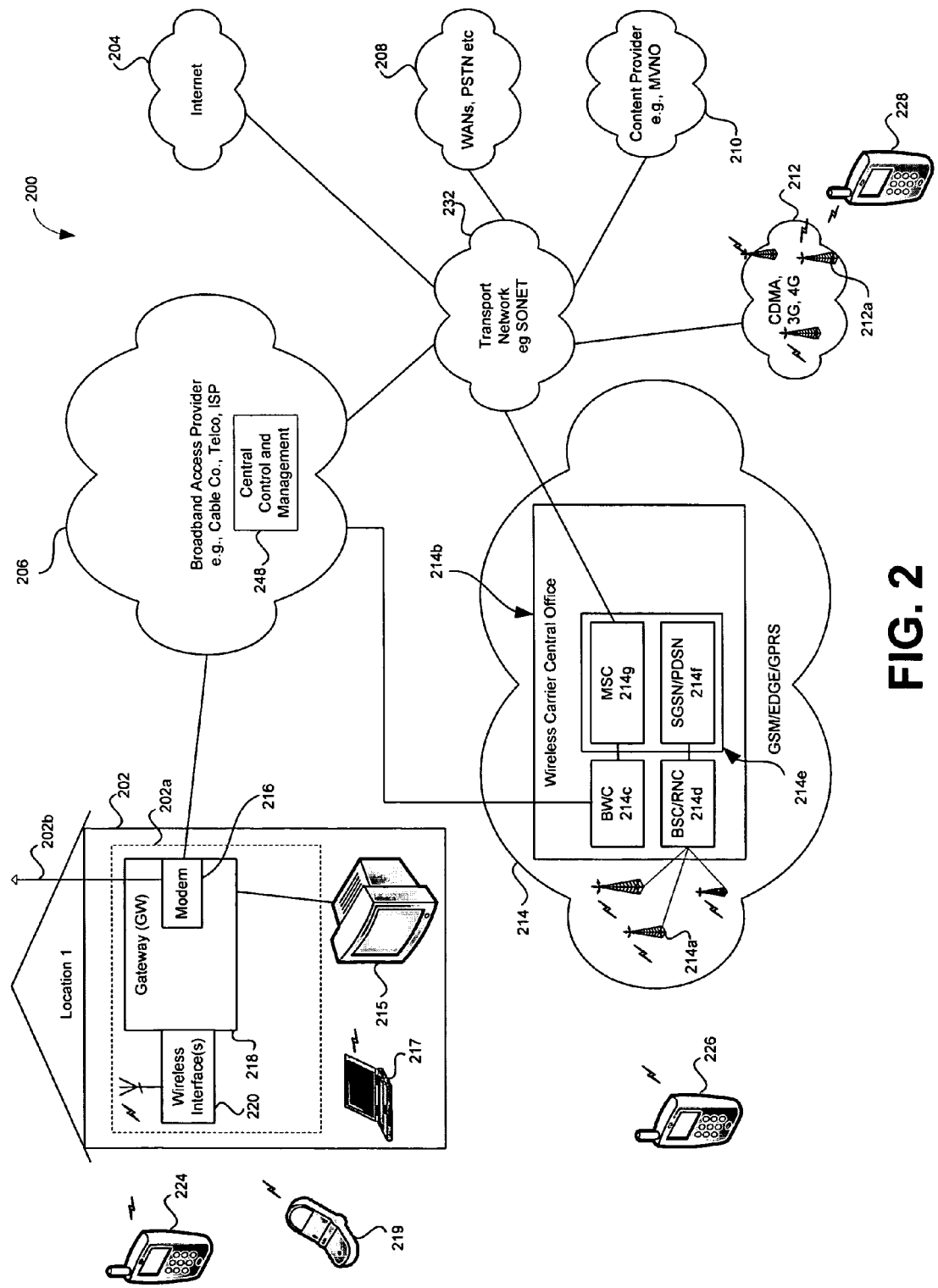
FIG. 2 shows a block diagram illustrating an exemplary communication system that may be utilized for simulcasting multimedia information in a broadband wireless local area network (WLAN) or personal area network (PAN), in accordance with a representative embodiment of the present invention.

FIG. 2 shows a block diagram illustrating an exemplary communication system 200 that may be utilized for simulcasting multimedia information in a broadband wireless local area network (WLAN) or personal area network (PAN), in accordance with a representative embodiment of the present invention. The exemplary communication system 200 of FIG. 2 provides handoff through simulcasting for wireless network traffic, for an active subscriber, from a wireless service provider servicing the active subscriber to a broadband wired and/or a wireless LAN (WLAN), and/or PAN using a broadband access gateway. Referring to FIG. 2, there is shown a first location 202, a broadband access provider (BAP) 206, a transport network block 232, an Internet 204, a WANs, PSTN, etc networks block 208, a content providers block 210, wireless wide area service provider networks 212, 214, a WLAN/PAN-enabled wireless handset 219, and a plurality of mobile access devices 224, 226, 228. The wireless interface 220, the gateway 218 with modem 216, the BAP 206, the GSM/EDGE/GPRS network 214, the transport network 232, and the CDMA network 236 of FIG. 2 may correspond, for example, to the wireless interface 120, the gateway 118 with modem 116, the BAP 106, the GSM/EDGE/GPRS network 114, the transport network 110, and the CDMA network 112, respectively, of FIG. 1. The illustration of FIG. 2 also comprises a central control and management block 248 that may correspond, for example, to the central control and management block 148 of FIG. 1.

The first location 202 comprises a broadband access gateway 218 with a modem 216, and a wireless interface 220. The first location may be a home, and the broadband access gateway 218 with the modem 216 and the wireless interface 220 may support a personal area network (PAN) and/or wireless local area network (WLAN), and may be referred to as a home network 202a. The wireless interface 220 may comprise a plurality of interfaces such as a Bluetooth interface, an IEEE 802.15.3a ultra-wideband interface, and any combination of IEEE 802.11 a, b, g and/or n interfaces. The wireless interface 220 may comprise an interface compatible with the WLAN/PAN-enabled wireless handset 219 operating at any of a number of frequencies including, for example, a 900 MHz, 2.4 GHz, or 5.8 GHz. In a representative embodiment of the present invention, the broadband access gateway 218 may comprise, for example, a set top box that may be coupled in a wireless or wired fashion to access devices such as, for example, a laptop computer or television, such as the laptop 217 and the television 215 of FIG. 2. Service may be provided to the home network 202a supported by the broadband access gateway 218 via the cable modem 216, which is coupled to the broadband access provider 206.

The broadband access provider 206 may be, for example, a cable company, telephone company (Telco), or an Internet service provider (ISP). The broadband access provider 206 may utilize any of the standardized formats such as DOCSIS, digital subscriber line (DSL), or local multipoint distribution system (LMDS). LMDS utilizes broadband wireless technology to deliver voice, video, data, and/or Internet services utilizing licensed or unlicensed spectrum in the frequency range of 25 GHz and higher. LMDS utilizes point-to-point or point-to-multipoint communication to provide broadband services, some of which rely on line of sight (LOS). LMDS is a fixed wireless solution, and as such, no mobility support is required.

The broadband access provider 206 may be also be a WiMAX or Institute of Electronic and Electrical Engineers, Inc. (IEEE) 802.16-compliant service provider. The IEEE 802.16 standard offers a wireless metropolitan area network (MAN) air interface which provides network access to buildings via external antennas that receive signals from a remotely located central base station. The signal received at the building may be communicated to a wired network infrastructure such as an IEEE 802.3 compliant communication network, or a wireless network infrastructure such as an IEEE 802.11a/b/g and/or n-compliant network. In instances where WiMAX is utilized, then antenna 202b may be utilized to receive and transmit signals between the broadband access provider 206 and the home network 202a.

The WANs, PSTN, etc networks block 208 may comprise networks such as private or public communication networks. For example, the WANs, PSTN, etc networks block 208 may comprise a public switched telephone network (PSTN) and a packet network such as a cellular digital packet data (CDPD) network.

The content providers block 210 may comprise network providers, which supply data and/or multimedia content. In a representative embodiment of the present invention, the content providers block 210 may comprise, for example, one or more mobile virtual network operators (MVNOs). A MVNO is a mobile service provider that provides mobile services to its subscribers by utilizing the network infrastructure of another company. In this regard, the MVNO enters into an agreement with a network operator to purchase network time such as minutes, which it resells to it own customers/subscribers. The MNVO utilizes the purchased time to provide, for example, multimedia content delivery to its subscribers.

The wireless service provider network 212 may, for example, utilize CDMA, 3G or 4G access technology and may comprise a plurality of cell sites. Cell site 212a may provide cellular service to the mobile access device 228 while the mobile access device 228 is within range of the cell site 212a. The wireless service provider network 214 may, for example, utilize the time division multiple access (TDMA) access technology of the GSM standard, and may include enhanced data rates for GSM evolution (EDGE) and/or general packet radio service (GPRS) data capability. The wireless service provider network 214 may comprise a plurality of cell sites and a wireless carrier central office 214b, the latter of which may comprise a mobile switching center (MSC) 214g. Cell site 214a may provide cellular service to mobile access device 226 while the mobile access device 226 is within range of the cell site 214a.

With reference to FIG. 2, in an illustrative embodiment of the invention, the broadband access gateway 218 may receive voice and multimedia information simulcasted from, for example, the wireless carrier central office 214b via the BAP 206. Upon receiving the simulcasted voice and multimedia information from the wireless carrier central office 214b, the broadband access gateway 218 may simulcast the voice information via, for example, an 802.11x compatible wireless local area network (WLAN) path (e.g., where "x" is a, b, g, and/or n) and/or via a IEEE 802.15.3a or Bluetooth personal area network wireless path that is compatible with the WLAN/PAN-enabled wireless handset 219, for example. In this regard, as an owner of the mobile access device 226, which is currently utilizing mobile access device 226 for a call with an owner and current user of mobile access device 228, migrates within range of the broadband access gateway 218, the wireless carrier central office 214b may begin simulcasting voice and data traffic to the broadband access gateway 218 and to the mobile access device 226. The simulcasted voice traffic received by the broadband access gateway 218 may also be communicated to a wireless handset such as, for example, the WLAN/PAN-enabled wireless handset 219 via the WLAN/PAN supported by the broadband access gateway 218. Hence, if the user of the mobile access device 226 is within operating range of the broadband access gateway 218 and the mobile access device 226 is low on battery power, the user may user may utilize a wireless handset such as the WLAN/PAN-enabled wireless handset 219 to continue the conversation uninterrupted.

In another aspect of the present invention, a user of the mobile access device 226 may still be within operating range of the broadband access gateway 218 and may receive a call from the owner and user of mobile access device 228. If the user of the mobile access device 226 cannot readily locate the mobile access device 226, the user of the mobile access device 226 may choose to employ any of a number wireless handsets at location 202 such as, for example, the WLAN/PAN-enabled wireless handset 219 to answer the call, since call traffic from the mobile access device 228 may be simulcasted over the WLAN/PAN supported by the broadband access gateway 218. If the user of the mobile access device 226 later locates the mobile access device 226, the user may decide to switch from using the WLAN/PAN-enabled wireless handset 219 to using the mobile access device 226 while still within an operating range of the broadband access gateway 218. However, as the user of the mobile access device 226 migrates from within the operating range of the broadband access gateway 218 to the operating range of cell site 214a, the service may switch from the wireless interface 220 of the broadband access gateway 218, to the wireless wide area network service provider 214.

In a representative embodiment of the present invention, the broadband access gateway 218 may have the capability to simulcast or multicast multimedia information that is simulcasted and received from the wireless carrier central office 214b, for example. In this regard, the multimedia information that is simulcasted or multicasted by the broadband access gateway 218 may be simultaneously consumed by one or a plurality of access devices located within the coverage area of PAN/WLAN serviced by the broadband access gateway 218 such as, for example, the mobile access devices 224, 226, the WLAN/PAN-enabled wireless handset 219, and the laptop 217.

A representative embodiment of the present invention may permit the user of a mobile access device such as, for example, the mobile access devices 224, 226, 228 to save the cost of wireless wide area network service for a call, by simulcasting the call to a broadband access gateway associated with the mobile access devices 224, 226, 228 and WLAN/PAN-enabled wireless handset 219. The simulcasting of call-related voice and/or multimedia information by the wireless carrier central office 214b allows the user to continue the call via a wireless handset in communication with the broadband access gateway, thereby freeing the call-related resources supporting the air interface of a wireless wide area network such as GSM/EGE/GPRS network 214, for example. In situations in which broadband service from a broadband access provider such as, for example, BAP 206 is already in place, support for simulcasting in accordance with a representative embodiment of the present invention may be provided at little or no additional cost to the subscriber.

In a representative embodiment of the present invention, a mobile access device such as mobile access devices 224, 226, 228 may, but need not be capable of communicating using the PAN/WLAN supported by a broadband access gateway such as, for example, the broadband access gateway 218. The mobile access devices 224, 226, 228 may support only a wireless wide area network such as the GSM/EDGE/GPRS network 214 or the CDMA network 212, for example, or may also support a personal area network (PAN) or wireless local area network (WLAN) such as those for which the broadband access gateway 218 and wireless interface 220 are equipped.

In a representative embodiment of the present invention, a wireless wide area network such as the GSM/EDGE/GPRS network 214, for example, that is serving a mobile access device such as, for example, the mobile access device 226 may determine that the mobile access device 226 is within the coverage area of a broadband access gateway such as, for example, the broadband access gateway 218 of FIG. 2, that is associated with the mobile access device 226. For example, in a representative embodiment of the present invention, the physical location of a broadband access gateway 218 and its estimated coverage area may be known by, for example, the wireless carrier central office 214b or the broadband access provider 206. The user may have established an association of one or more mobile access devices such as, for example, the mobile access devices 224, 226, 228, with a broadband access gateway such as, for example, the broadband access gateway 218 with the wireless interface 220. The physical location of a mobile access device may be determined by the mobile access device, or by the infrastructure of the serving wireless wide area network such as, for example, the GSM/EDGE/GPRS network 214. A wireless wide area network of a representative embodiment of the present invention may, for example, use information about the physical location of a mobile access device, and the physical location and coverage area of a broadband access gateway associated with the mobile access device, to choose to simulcast, to the broadband access gateway, multimedia information directed to the mobile access device.

In a representative embodiment of the present invention, a broadband access gateway may, upon receiving simulcast multimedia information, cause a wireless handset or access device with which it is in communication to periodically alert a nearby user. For example, a distinctive ring signal may be employed to allow a user in the vicinity of the WLAN/PAN-enabled wireless handset or access device to recognize the signal as an indication that simulcasting of a voice or multimedia call is occurring, and that an active call on a mobile access device may be continued using the ringing WLAN/PAN-enabled wireless handset or access device in communication with an associated broadband access gateway. Referring to the exemplary embodiment of FIG. 2, when a mobile access device such as, for example, the mobile access device 226 that is actively engaged in a call enters within the coverage area of an associated broadband access gateway such as, for example, the broadband access gateway 218, a WLAN/PAN-enabled wireless handset or access device in communication with the broadband access gateway 218 such as, for example, the WLAN/PAN-enabled wireless handset 219, may be made to alert the user in a recognizable fashion. The user being served via the mobile access device 226 may then choose to continue the call using the WLAN/PAN-enabled wireless handset 219, or any other WLAN/PAN-enabled wireless handset or access device in communication with the broadband access gateway 218.

In a representative embodiment of the present invention, a user of a mobile access device such as, for example, the mobile access device 226 may be notified when multimedia information is simulcast to a broadband access gateway that is associated with the mobile access device 226. This may make the user of the mobile access device 226 aware of their ability to continue the call using a WLAN/PAN-enabled wireless handset or access device located in their home, for example. A WLAN/PAN-enabled wireless handset such as, for example, the WLAN/PAN-enabled wireless handset 219 of FIG. 2 that is in their home may be in communication with a broadband access gateway such as the broadband access gateway 218, for example. The broadband access gateway 218 may be sent a simulcast of call-related voice or multimedia information of a wide area network call involving a mobile access device such as, for example, the mobile access device 226 that is associated with the broadband access gateway 218. This may occur, for example, when it is determined that the mobile access device 226 is within the coverage area of the broadband access gateway 218. Upon commencing simulcasting of call-related voice information, the wireless carrier central office of a serving wide area network such as the GSM/EDGE/GPRS network 214, for example, may cause a notification to be sent to the mobile access device 226. The notification may comprise, for example, a text message, an activated icon, or an audible signal, at the mobile access device 226. Such notification may serve to remind the user of the mobile access device 226 that the WLAN/PAN-enabled wireless handset 219 and/or access devices in communication with an associated broadband access gateway may be employed to continue the call without incurring charges of the serving wireless wide area network (i.e., the GSM/EDGE/GPRS network 214).

Figure 3:
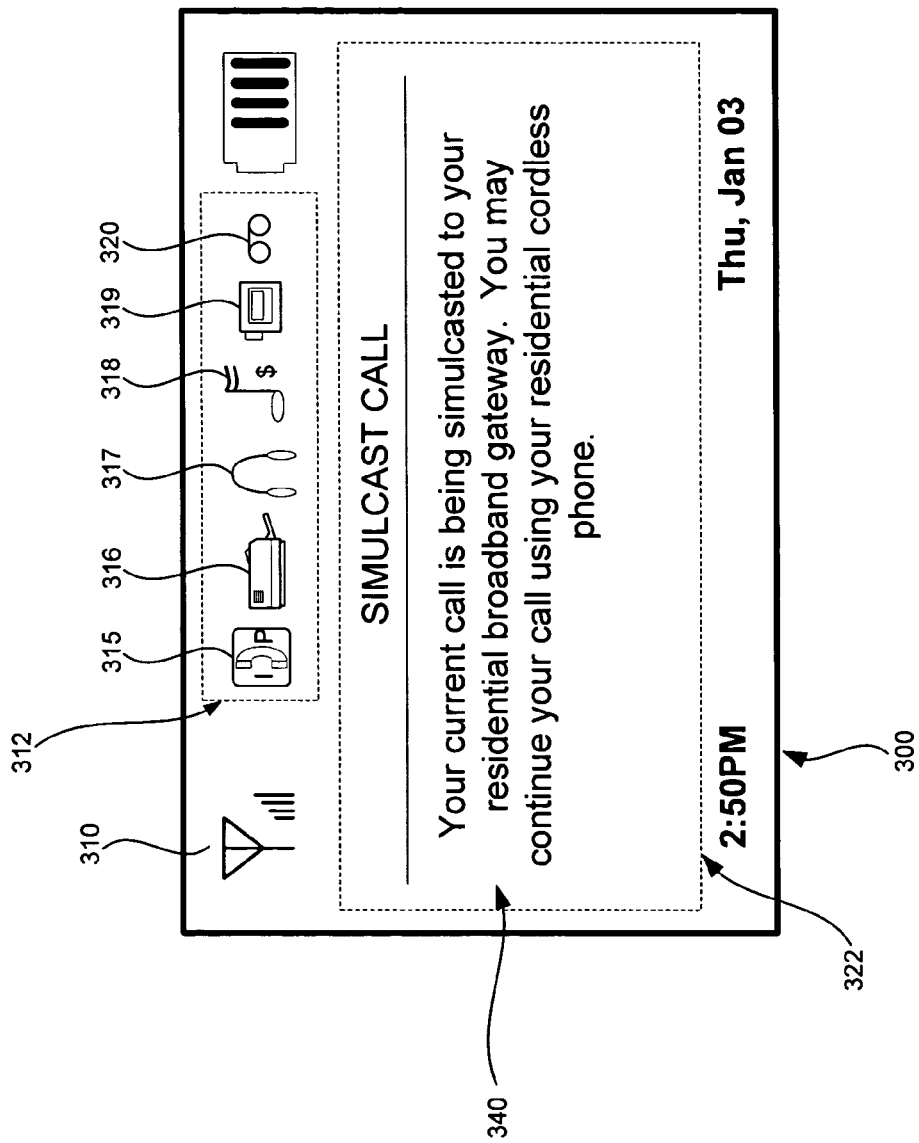
FIG. 3 shows an illustration of a display comprising an exemplary simulcast notification screen that may be displayed by a mobile access device such as, for example, the mobile access devices of FIG. 2, in accordance with a representative embodiment of the present invention.

FIG. 3 shows an illustration of a display 300 comprising an exemplary simulcast notification screen 322 that may be displayed by a mobile access device such as, for example, the mobile access devices 224, 226, 228 of FIG. 2, in accordance with a representative embodiment of the present invention. The display 300 of FIG. 3 comprises a network indicator 310, a network services indicator area 312, a battery life indicator, a time of day indicator, and a day and date indicator. The network services indicator area 312 of FIG. 3 comprises an Internet protocol (IP) phone service icon 315, a printer service icon 316, a stereo entertainment icon 317, a pay music service icon 318, a video entertainment icon 319, and a call recording icon 320 showing those services that may be supported and advertised by a broadband access gateway such as, for example, the gateway 218 of FIG. 2, as being available to an appropriately identified or authorized user of the access device. Further information about the advertising of multimedia information and media-related services by a broadband access gateway may be found in U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

In a representative embodiment of the present invention, the simulcast notification screen 322 of FIG. 3 may be displayed when, for example, a mobile access device such as the mobile access devices 224, 226, 228 migrates within the coverage area of an associated broadband access gateway during an active call via a wide area network such as, for example, the GSM/EDGE/GPRS network 214. The simulcast notification screen 322 comprises explanatory text 340 informing the user of the simulcasting of call-related voice or multimedia information by the serving wireless wide area network, to a broadband access gateway that is associated with the mobile access device engaged in the wireless wideband network call. Upon receiving such a notification, the user of a mobile access device such as mobile access device 226, for example, may continue the active call using a WLAN/PAN-enabled wireless handset such as, for example, the WLAN/PAN-enabled wireless handset 219 that is compatible with the wireless interface of an associated broadband access gateway such as, for example, the broadband access gateway 218, for example. The call may also be made available to access devices in communication with the broadband access gateway 218 such as, for example, the laptop 217. Such a broadband access gateway may also simulcast the received simulcast of the wireless wide area network call, permitting a number of access devices in communication with the broadband access gateway to participate in the call. It should be noted that the illustration of FIG. 3 is for purposes of explanation and does not represent particular limitations of the present invention, as other forms of user notification such as text, icons, audio, visual indicators, vibration, etc., may be employed without departing from the spirit and scope of the present invention.

In a representative embodiment of the present invention, wireless wide area network radio frequency resources used for service of a mobile access device such as, for example, the mobile access devices 224, 226, 228 of FIG. 2 may be freed when an associated broadband access gateway detects an answer condition of a WLAN/PAN-enabled wireless handset or access device with which it is in communication, when simulcasting of an active call with the mobile access device is taking place. For example, radio spectrum, time slots, voice channels, bandwidth, circuits, logical channels, etc., may be de-allocated when it is determined that a simulcast of a call served by a wireless wide area network such as, for example, the GSM/EDGE/GPRS network 214 is served via a WLAN/PAN-enabled wireless handset or access device through a broadband access gateway such as, for example, the broadband access gateway 218 of FIG. 2. The freeing of such resources may reduce costs to the subscriber by eliminating air-time charges from the service provider that operates the wireless wide area network serving the mobile access device.

In one representative embodiment of the present invention, a call simulcast by a wireless wide area network such as, for example, the GSM/EDGE/GPRS network 214 of FIG. 2, to both a mobile access device and an associated broadband access gateway may end, when both the mobile access device and a WLAN/PAN-enabled wireless handset or access device in active call communication with the broadband access gateway are detected to be in an on-hook condition. In another representative embodiment of the present invention, the existence of an on-hook state at both the mobile access device and the WLAN/PAN-enabled wireless handset or access device in communication with the associated broadband access gateway may permit maintenance of the call for a predetermined period of time after the on-hook condition begins. After expiration of the predetermined period of time, the wireless wide area network such as the GSM/EDGE/GPRS network 214, for example, or the associated broadband access gateway may end the call and cause release of any call resources. When the wireless wide area network initiates an end to the call, the wireless wide area network may notify the broadband access gateway associated with the mobile access device that the call has ended. This behavior of a representative embodiment of the present invention may permit the user of a WLAN/PAN-enabled wireless handset such as, for example, the WLAN/PAN-enabled wireless handset 219 of FIG. 2, or a mobile access device like the mobile access device 226, for example, to transition/hand-off the call from one device to the other without loss of the call being simulcasted, even with a brief period without an active party.

In a representative embodiment of the present invention, a user of a mobile access device such as, for example, the mobile access device 226 of FIG. 2, may be sent notification of the opportunity to transfer/handoff an active call to the mobile access device 226, from a WLAN/PAN-enabled wireless handset or access device in communication with a broadband access gateway associated with the mobile access device 226. The location of the mobile access device 226 may be determined by the mobile access device, by the serving wireless wide area network infrastructure (e.g., the GSM/EDGE/GPRS network 214), or a combination of both.

Figure 4:
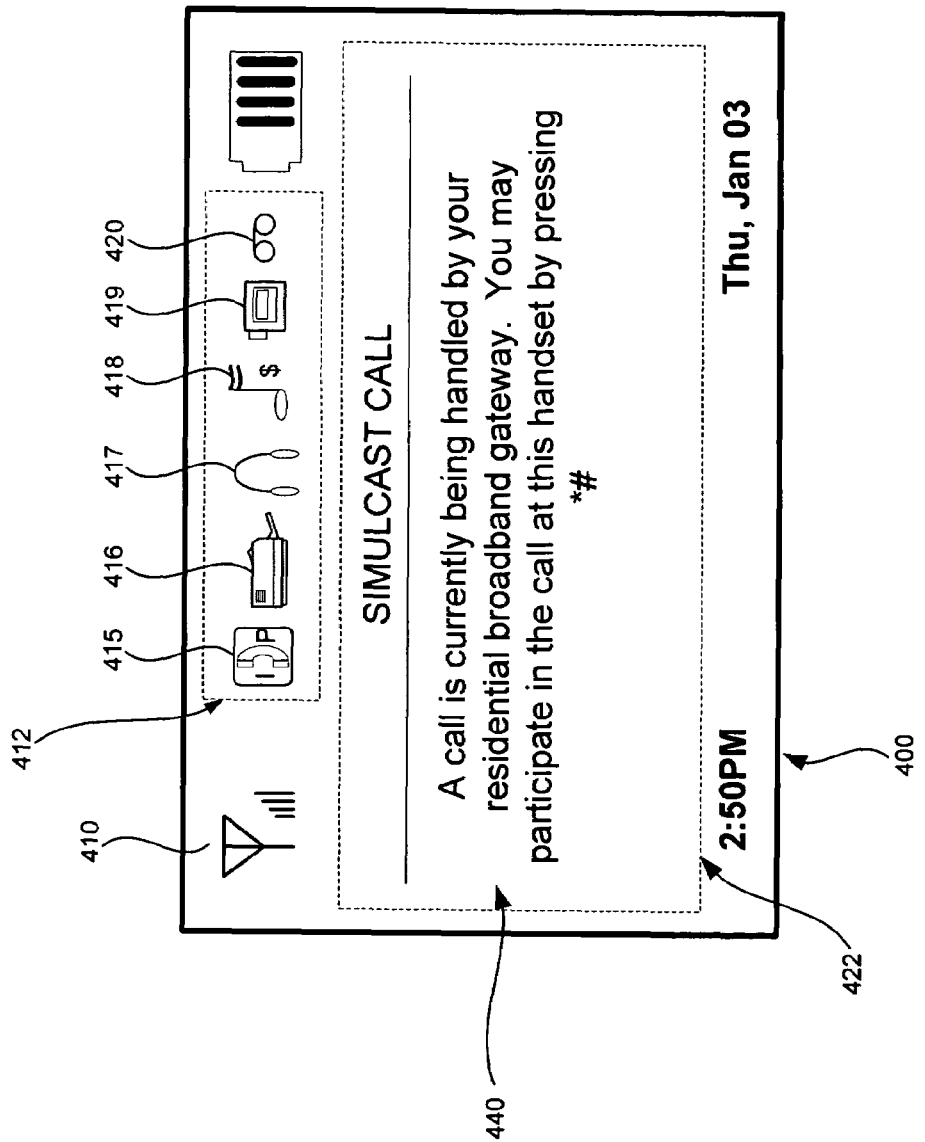
FIG. 4 shows an illustration of a display comprising another exemplary simulcast notification screen that may be displayed by a mobile access device such as, for example, the mobile access devices of FIG. 2, in accordance with a representative embodiment of the present invention.

FIG. 4 shows an illustration of a display 400 comprising another exemplary simulcast notification screen 422 that may be displayed by a mobile access device such as, for example, the mobile access devices 224, 226, 228 of FIG. 2, in accordance with a representative embodiment of the present invention. Similar to the display 300 of FIG. 3, the display 400 of FIG. 4 comprises a network indicator 410, a network services indicator area 412, a battery life indicator, a time of day indicator, and a day and date indicator. The network services indicator area 412 of FIG. 4 comprises an Internet protocol (IP) phone service icon 415, a printer service icon 416, a stereo entertainment icon 417, a pay music service icon 418, a video entertainment icon 419, and a call recording icon 420 showing those services that may be advertised by a broadband access gateway such as, for example, the gateway 218 of FIG. 2, as being available to an appropriately identified or authorized user of the access device. Each of the visual elements of FIG. 4 may correspond to, for example, the similarly named elements of FIG. 3.

In a representative embodiment of the present invention, the simulcast notification screen 422 of FIG. 4 may be displayed when, for example, a mobile access device such as the mobile access devices 224, 226, 228 of FIG. 2 is identified as being within the coverage area of an associated broadband access gateway on which a simulcast call is active. The simulcast notification screen 422 comprises explanatory text 440 informing the user of a mobile access device such as, for example, the mobile access device 226 that a call presently being received by a WLAN/PAN-enabled wireless handset or access device in communication with an associated broadband access gateway such as, for example, the broadband access gateway 218 may be continued using the mobile access device 226. Upon receiving such a notification, the user of the mobile access device 226, for example, may participate in the call using the mobile access device 226, or may transfer/hand-off the call to the mobile access device 226 from a WLAN/PAN-enabled wireless handset or access device in communication with the associated broadband access gateway 218. In a representative embodiment of the present invention, multiple access devices and/or WLAN/PAN-enabled wireless handsets in communication with the broadband access gateway 218 may participate in the call. In addition, a call participant using a WLAN/PAN-enabled wireless handset or access device in communication with a broadband access gateway such as the broadband access gateway 218 may continue as a party to the call after the associated mobile access device has migrated outside of the coverage area of the broadband access gateway 218 into the service of a wireless wide area network such as, for example, the GSM/EDGE/GPRS network 214. Simulcasting of the call by a wireless wide area network such as the GSM/EDGE/GPRS network 214, for example, may end if the user of the participating WLAN/PAN-enabled wireless handset or access device chooses to go on-hook while the associated mobile access device is outside of the coverage area of the broadband access gateway. It should be noted that the illustration of FIG. 4 is for purposes of explanation and does not represent particular limitations of the present invention, as other forms of user notification such as text, icons, audio, visual indicators, vibration, etc., may also be employed without departing from the spirit and scope of the present invention.

Figure 5:
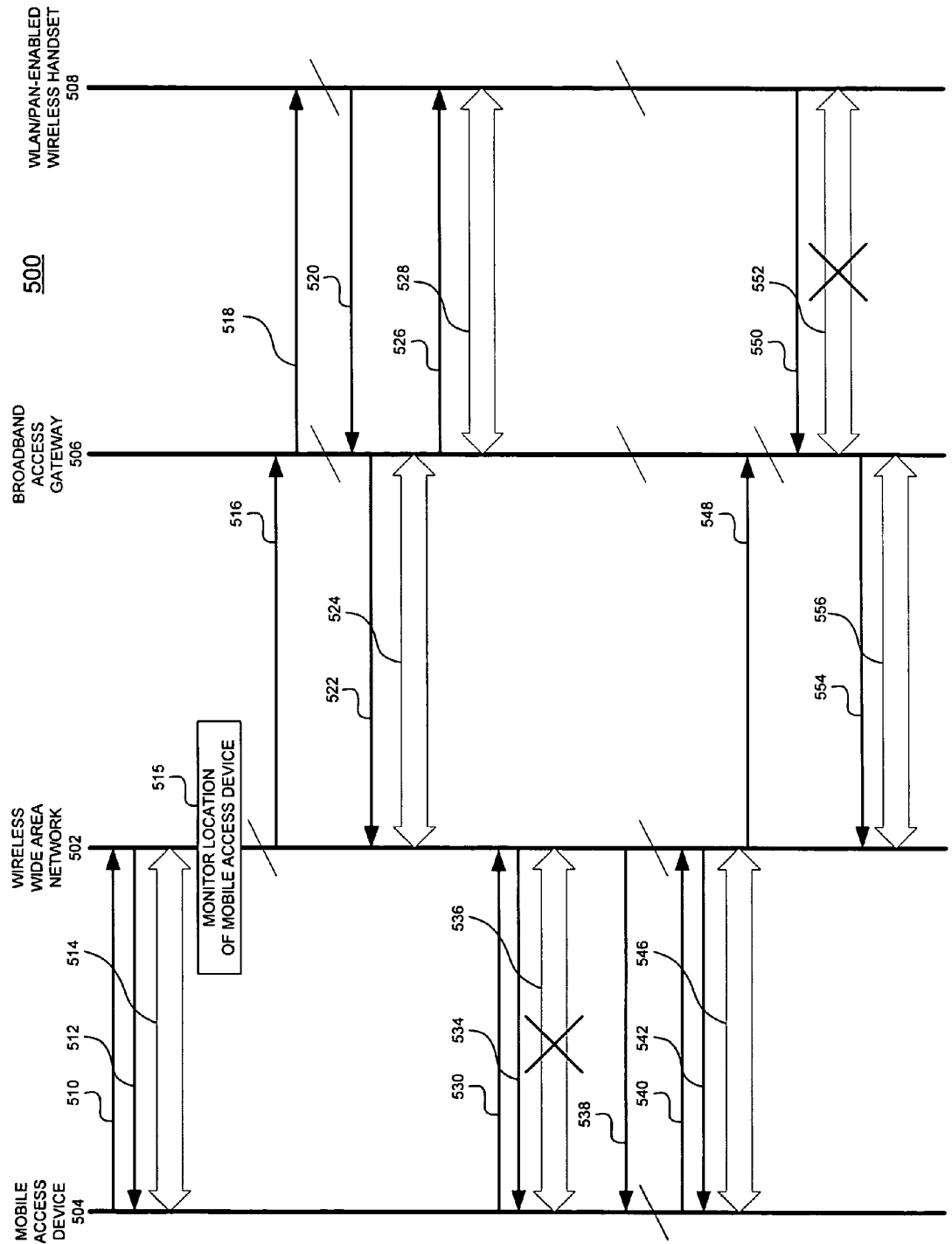
FIG. 5 is a message exchange diagram illustrating an exemplary exchange of messaging during a user call via a wireless wide area network such as, for example, the GSM/EDGE/GPRS network of FIG. 2, involving the simulcasting of call-related information to a WLAN/PAN-enabled wireless handset via a broadband access gateway, in accordance with a representative embodiment of the present invention.

FIG. 5 is a message exchange diagram 500 illustrating an exemplary exchange of messaging during a user call via a wireless wide area network such as, for example, the GSM/EDGE/GPRS network 214 of FIG. 2, involving the simulcasting of call-related information to a WLAN/PAN-enabled wireless handset via a broadband access gateway, in accordance with a representative embodiment of the present invention. In the illustration of FIG. 5, the four vertical lines represent a wireless wide area network 502, a mobile access device 504, a broadband access gateway 506, and a WLAN/PAN-enabled wireless handset 508 that may correspond to, for example, the GSM/EDGE/GPRS network 214, the mobile access device 226, the broadband access gateway 218, and the WLAN/PAN-enabled wireless handset 219, respectively, of FIG. 2. The horizontal lines of FIG. 5 represent message traffic or groups of messages exchanged between a source and a destination, the destination being indicated by the arrow head. The vertical dimension represents time, advancing downward on the message exchange diagram 500.

In a representative embodiment of the present invention, the mobile access device 504 may initiate a call via the wide area network 502 using messaging 510, 512 to any of several destinations including, for example, another mobile access device served by the wireless wide area network 502, or a party accessible via the transport network 232 of FIG. 2. Although this example describes the initiation of a call by the mobile access device 504, a similar sequence of events within the spirit and scope of the present invention may be applied to a call received by the mobile access device 504. The messaging 510, 512 may comprise multiple messages for establishing a wireless call on the wireless wide area network 502. In the illustration of FIG. 5, the wireless wide area network 502 may activate the path 514 to transport voice signals between the mobile access device 504 and the wireless wide area network 502. During establishment of the call, the wireless wide area network 502 may determine that the mobile access device 504 is associated with the broadband access gateway 506. The wireless wide area network 502 may then begin monitoring the location of the mobile access device 504 relative to the location of the associated broadband access gateway 506, using location monitoring functionality 515. At some later point during the call, the user of the mobile access device 504 may migrate to within the coverage area of the broadband access gateway 506, and the location monitoring functionality 515 may notify the broadband access gateway 506 using messaging 516. The broadband access gateway 506 may then begin sending notification messaging 518 to the WLAN/PAN-enabled wireless handset 508 to cause a user to be notified of the option of participating in the call via the WLAN/PAN-enabled wireless handset 508. Notification messaging 518 may comprise, for example, alerting signals or data messaging to cause the WLAN/PAN-enabled wireless handset to produce alerting signals to a user in the vicinity of the WLAN/PAN-enabled wireless handset 508.

The user of the mobile access device 504, being within the coverage area of the broadband access gateway 506, or another party aware of the alerting signals of the WLAN/PAN-enabled wireless handset 508, may choose to take part in the call using the WLAN/PAN-enabled wireless handset 508, causing messaging 520 to be sent to the broadband access gateway 506, indicating an answer or off-hook condition. The broadband access gateway 506 may then send messaging 522 to the wireless wide area network 502 signaling the acceptance of the call by the WLAN/PAN-enabled wireless handset 508. In one representative embodiment of the present invention, the wireless wide area network 502 may then establish a path 524 to simulcast the call information of path 514 to the broadband access gateway 506. In another representative embodiment, the path 524 may be established when it is determined that the broadband access gateway 506 is associated with the mobile access device 504. Following establishment of the path 514, the broadband access gateway 506 may send messaging 526 to the WLAN/PAN-enabled wireless handset 508 to indicate establishment of a simulcast connection, and may then establish path 528 with the WLAN/PAN-enabled wireless handset 508 for exchange of call-related (e.g., voice) information. At that point, the WLAN/PAN-enabled wireless handset 508 is party to the call, and the user of the mobile access device 504 may choose to end call service via the wireless wide area network 502, by causing messaging 530, 534 to occur. In one representative embodiment in accordance with the present invention, the path 536 (originally established as path 514) may then be torn down. In another representative embodiment, the path 536 may be maintained. The wireless wide area network 502 may then send messaging 538 to the mobile access device 504, to notify the user of the mobile access device 504 of the option to participate in the call. Monitoring of the location of the mobile access device 504 relative to the broadband access gateway 506 by the location monitoring functionality 515 may later cause messaging (not shown) to be sent to the mobile access device 504, canceling the earlier notice of the option to participate in the call.

At some later time, the user of the mobile access device 504 may elect to once again participate in the call using the mobile access device 504, and may cause messaging 540, 542 to be exchanged with the wireless wide area network 502. The wireless wide area network 502 may then establish path 546 with the mobile access device 504 for simulcasting of call-related information, or use a path was maintained, and may notify the broadband access gateway 506 of the participation of the mobile access device 504 via simulcasting. At some later time, the user may end the use of the WLAN/PAN-enabled wireless handset 508, causing messaging 550 to be sent to the broadband access gateway 506 to signal the on-hook condition of the WLAN/PAN-enabled wireless handset 508. The broadband access gateway 506 may then tear down the path 552 (originally established as path 528). The broadband access gateway may also notify the wireless wide area network 502 of the end of simulcasting to the WLAN/PAN-enabled wireless handset 508 via messaging 554, after which the path 556 (originally established as path 524) is torn down.

In a representative embodiment of the present invention, either a wireless wide area network such as, for example, the GSM/EDGE/GPRS network 214 of FIG. 2, or a broadband access gateway such as, for example, the broadband access gateway 218 of FIG. 2 may filter call-related information to be simulcast to a WLAN/PAN-enabled wireless handset or access device. For example, a mobile access device such as the mobile access devices 224, 226, 228 of FIG. 2 may comprise a mobile multimedia handset, and may be capable of exchanging multimedia information such as streaming video, broadcast video, digitized voice, digital data, text, digitized audio, digitized still images, digitized video, and digitized music, for example. A WLAN/PAN-enabled wireless handset such as the WLAN/PAN-enabled wireless handset 219 of FIG. 2 may be limited in its ability to process such multimedia information and may be capable, for example, of only voice communication. Accordingly, a wireless wide area network or broadband access gateway in accordance with a representative embodiment of the present invention may filter the multimedia information of the call, to pass to the WLAN/PAN-enabled wireless handset 219 only those elements capable of being processed by the WLAN/PAN-enabled wireless handset 219. In a representative embodiment of the present invention, filtering may comprise removing information elements that cannot be processed by an access device/WLAN/PAN-enabled wireless handset, and modifying information components from one encoding or format to another so as to be usable by an access device/WLAN/PAN-enabled wireless handset. Elements of the call information not able to be processed by the WLAN/PAN-enabled wireless handset may be discarded, or may be stored or redirected to another location within the communication system 200 shown in FIG. 2. An example of such redirection of multimedia information may be found in U.S. patent application Ser. No. 11/094,045, entitled "Handling Of Multimedia Call Sessions And Attachments Using Multi-Network Simulcasting", filed Mar. 30, 2005, the complete subject matter of which is hereby incorporated herein by reference, in its entirety.

Figure 6:
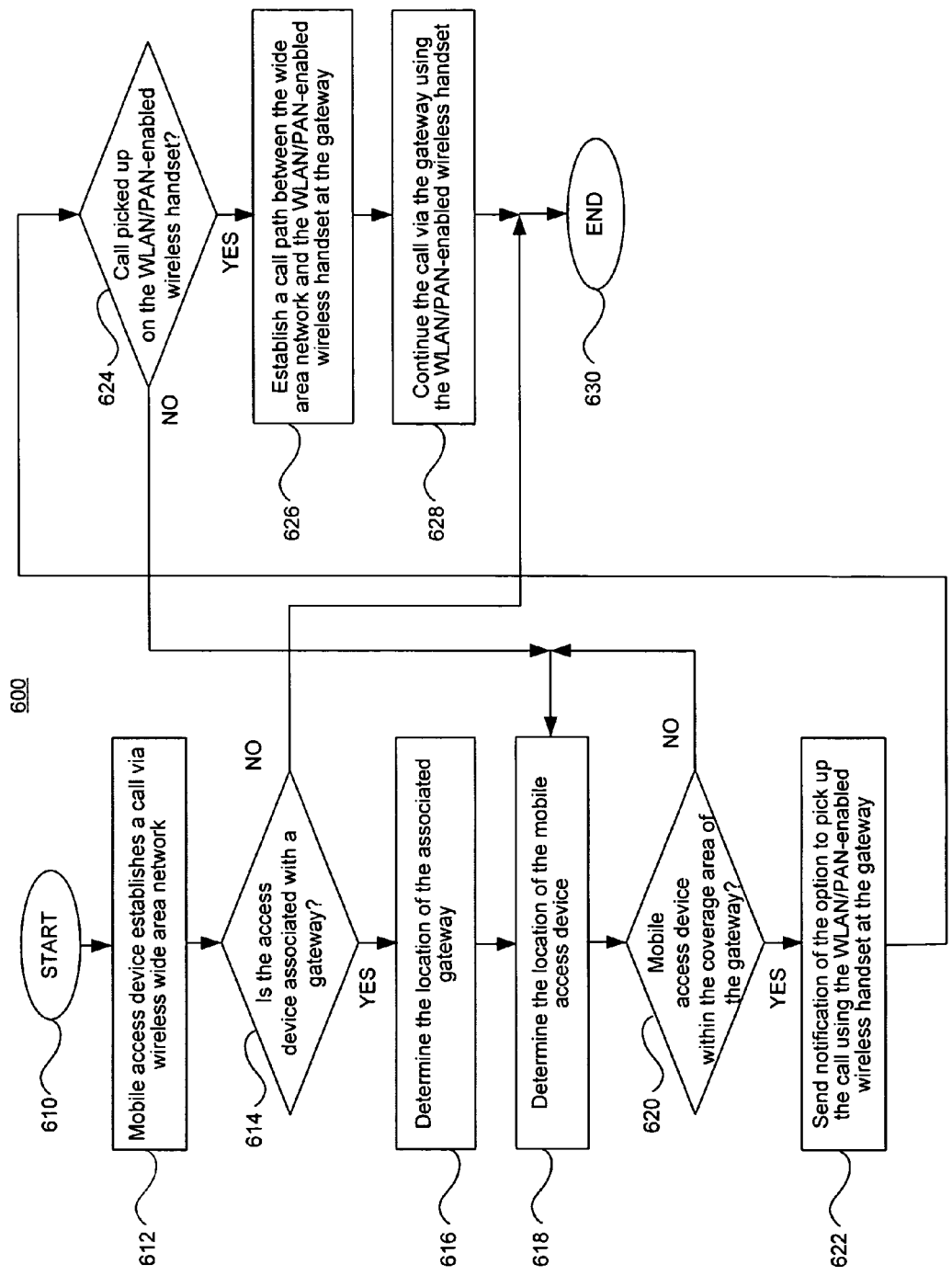
FIG. 6 shows a flowchart illustrating an exemplary method of simulcasting a call served by a wireless wide area network to a WLAN/PAN-enabled wireless handset via a broadband access gateway such as, for example, the WLAN/PAN-enabled wireless handset, the GSM/EDGE/GPRS network, and the broadband access gateway, respectively, of FIG. 2, in accordance with a representative embodiment of the present invention.

FIG. 6 shows a flowchart illustrating an exemplary method of simulcasting a call served by a wireless wide area network to a WLAN/PAN-enabled wireless handset via a broadband access gateway such as, for example, the WLAN/PAN-enabled wireless handset 219, the GSM/EDGE/GPRS network 214, and the broadband access gateway 218, respectively, of FIG. 2, in accordance with a representative embodiment of the present invention. As an aid in the understanding of a representative embodiment of the present invention, the following description of the method of FIG. 6 makes reference to elements of FIG. 2. The method of FIG. 6 begins with a mobile access device such as, for example, the mobile access device 224 in an idle state (block 610). At some point, the user of the mobile access device 224 establishes a call via the wireless wide area network (block 612). In a representative embodiment of the present invention, call establishment may result from the placement or receipt of a call. At that time, the serving wireless wide area network may determine whether the mobile access device is associated with a broadband access gateway such as, for example, the gateway 218. If the mobile access device is not associated with a broadband access gateway, simulcasting of the call to a WLAN/PAN-enabled wireless handset at a broadband access gateway is not possible, and the method of FIG. 6 ends (block 630).

If, however, the mobile access device is associated with a broadband access gateway, the method of FIG. 6 determines the geographic location of the broadband access gateway (block 616). The method then begins monitoring the call by determining the location of the mobile access device (block 618). If the mobile access device is not within the coverage area of the associated broadband access gateway (block 620), the method continues the monitoring of the location of the mobile access device (block 618). If the mobile access device is within the coverage area of the associated broadband access gateway (block 620), the method of FIG. 6 may cause notification of the option to pick up the call using a WLAN/PAN-enabled wireless handset at the broadband access gateway to be sent (block 622). The notification may be conveyed in the form of, for example, ring/alert signals or data message(s) that cause a user at the location of the broadband access gateway to be made aware of the opportunity to pick up the call. In one representative embodiment of the present invention, if a user picks up the call using, for example, a WLAN/PAN-enabled wireless handset in communication with the broadband access gateway (block 624), a call path may be established between the wireless wide area network (e.g., the GSM/EDGE/GPRS network 214) and the WLAN/PAN-enabled wireless handset in communication with the associated broadband access gateway (block 626). In another representative embodiment of the present invention, the call path may be established when it is determined that the mobile access device is associated with a broadband access gateway (at block 614).

Figure 7:
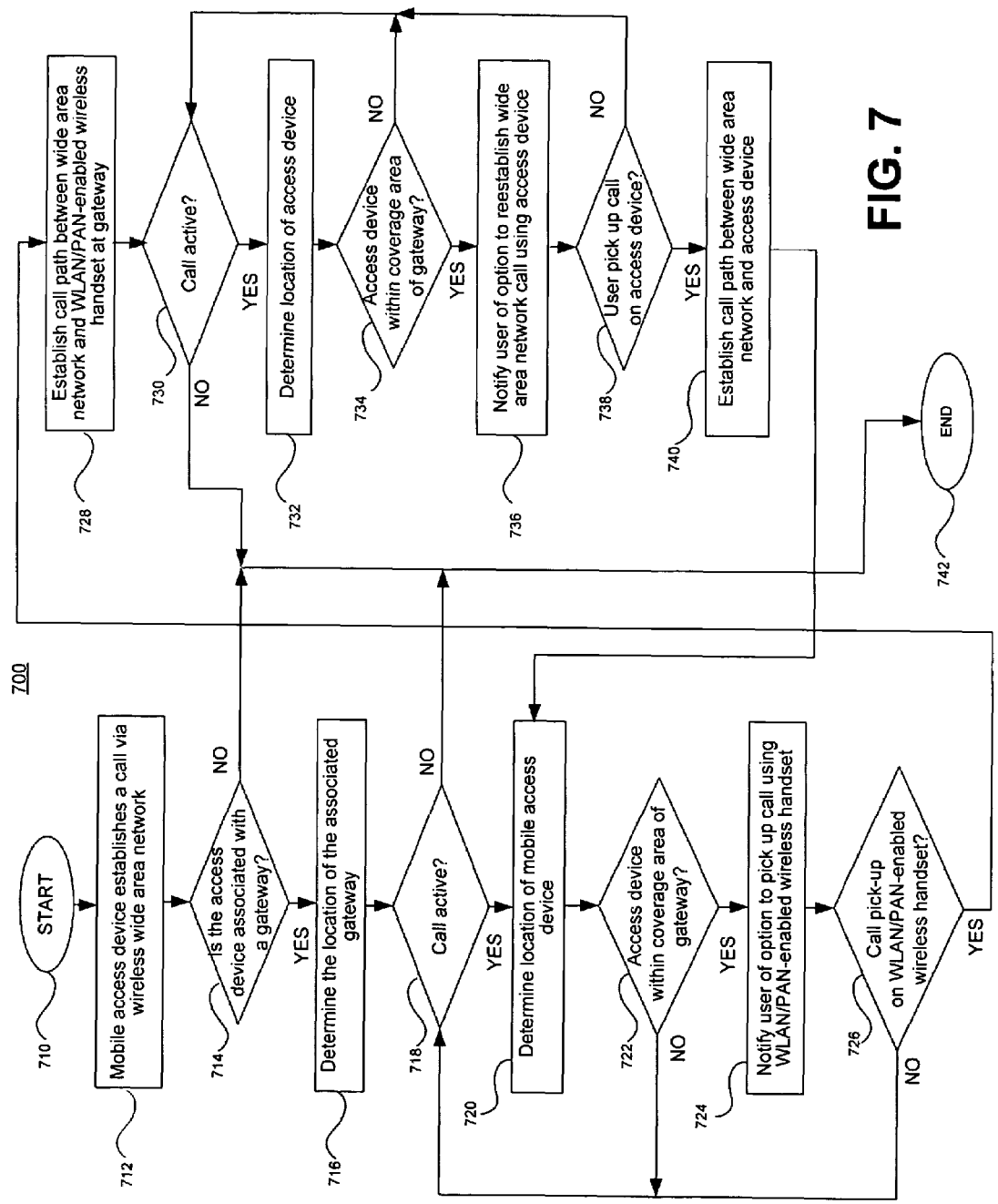
FIG. 7 shows a flowchart illustrating another exemplary method of simulcasting a call served by a wireless wide area network such as, for example, the GSM/EDGE/GPRS network of FIG. 2, to a WLAN/PAN-enabled wireless handset via a broadband access gateway such as, for example, the broadband access gateway of FIG. 2, in accordance with a representative embodiment of the present invention.

FIG. 7 shows a flowchart illustrating another exemplary method of simulcasting a call served by a wireless wide area network such as, for example, the GSM/EDGE/GPRS network 214 of FIG. 2, to a WLAN/PAN-enabled wireless handset via a broadband access gateway such as, for example, the broadband access gateway 218 of FIG. 2, in accordance with a representative embodiment of the present invention. The following description makes reference to the elements of FIG. 2 to aid understanding of the representative embodiment of the present invention shown in FIG. 7. The method of FIG. 7 begins with a mobile access device such as, for example, the mobile access device 224 in an idle state (block 710). At some point, the user of the mobile access device 224 establishes a call via the wireless wide area network (block 712). The call may be established, for example, as part of placing or receiving a call. At that time, the serving wireless wide area network such as, for example, the GSM/EDGE/GPRS network 214 may determine whether the mobile access device is associated with a broadband access gateway such as, for example, the broadband access gateway 218. If the mobile access device is not associated with a broadband access gateway, simulcasting of the call to a WLAN/PAN-enabled wireless handset at a broadband access gateway is not possible, and the method ends (block 742).

If, however, the mobile access device (e.g., the mobile access device 224) is associated with a broadband access gateway, the method of FIG. 7 determines the geographic location of the associated broadband access gateway (block 716). The method then determines whether the call is still active (block 718). If the call is no longer active, the method ends (block 742). If, however, the call is still active, a determination is made as to whether the mobile access device is within the coverage area of the associated broadband access gateway (block 722). If the mobile access device is not within the coverage area of the associated broadband access gateway, the method continues to check by looping back (block 718). If the mobile access device is within the coverage area of the associated broadband access gateway, the user is notified of the option to pick up the call using a WLAN/PAN-enabled wireless handset (e.g., the WLAN/PAN-enabled wireless handset 219) in communication with the associated broadband access gateway (block 724). The user may be notified via, for example, a message, an icon, or an indicator on the mobile access device, or via ringing, messaging, or other forms of alerting sent to the WLAN/PAN-enabled wireless handset 219 or the associated broadband access gateway. A determination is then made as to whether the call is being picked up via the WLAN/PAN-enabled wireless handset at the associated gateway (block 726). If the call has not been picked up at the WLAN/PAN-enabled wireless handset, the method loops by checking for the end of the call (block 718).

In one representative embodiment of the present invention, the method of FIG. 7 may establish a call path between the wireless wide area network serving the mobile access device and the WLAN/PAN-enabled wireless handset at the associated gateway, for example, when the call is picked-up (block 728). In another representative embodiment of the present invention, the call path may be established and simulcasting of the call information to the associated broadband access gateway may begin when it is determined that the mobile access device is within the coverage area of the associated broadband access gateway (block 714). In yet another representative embodiment of the present invention, the call path may be established or simulcasting may begin when it is determined that the mobile access device has an associated broadband access gateway. A determination is then made whether the call is active (block 730). If the call is no longer active, the method of FIG. 7 ends (block 742). If, however, the call is active, a determination of the current location of the mobile access device is made (block 732), and whether the mobile access device is within the coverage area of the associated gateway (block 734). If the mobile access device is not within the coverage area of the associated gateway, the method loops to determine whether the call is still active (block 730). If, however, the mobile access device is within the coverage area of the associated gateway, the user may be notified of the option to re-establish the call using the mobile access device (block 736), and a check may be made as to whether the user has elected to pick up the call using the mobile access device (block 738). If the user does not elect to continue the call using the mobile access device, the method again checks as to whether the call is still active (block 730). If the user elects to use the mobile access device for the next segment of the call, an active call may be established between the wide area network and the mobile access device (block 740), and the method may return to the portion that monitors the call when the mobile access device is in use (block 720).

The methods described above with respect to FIGS. 6 and 7 illustrate only two of many possible representative embodiments of the present invention.

Aspects of the present invention may be seen in a system supporting simulcasting of a wide area network call via a broadband access gateway. Such a system may comprise a gateway communicatively coupled to a broadband network and at least one wireless interface, the gateway capable of selectively exchanging multimedia information among the at least one wireless interface and the broadband network, and of communicating with a plurality of access devices via the at least one wireless interface. The gateway may be capable of exchanging, with a wireless wide area network via the broadband network, multimedia information concurrently exchanged wirelessly by the wireless wide area network with a first of the plurality of access devices. The gateway may also be capable of establishing with a second of the plurality of access devices, via the at least one wireless interface, a call path for exchange of the multimedia information, and of exchanging the multimedia information with the second of the plurality of access devices, via the at least one wireless interface. In addition, the gateway may be capable of determining whether the first of the plurality of access devices is within a coverage area of the at least one wireless interface, and of notifying the second of the plurality of access devices of the establishment of the call path for the exchange of multimedia information.

In a representative embodiment of the present invention, the first and second of the plurality of access devices may be the same access device. The gateway may be capable of filtering multimedia information so as to be compatible with the second of the plurality of access devices, where multimedia information may comprise at least one of streaming video, broadcast video, voice, digital data, text, digitized audio, digitized still images, digitized video, and digitized music. The at least one wireless interface may be compliant with the Bluetooth V1.2 or compatible personal area network (PAN) specification, and may be compliant with at least one of the Institute of Electrical and Electronics Engineers (IEEE) 802.11a, 802.11b, 802.11g, and 802.11n standards. The at least one wireless interface may comprise two wireless interfaces.

In various representative embodiments of the present invention, the broadband network may comprise at least one of a digital subscriber line (DSL) network, a cable network, a satellite network, a local multipoint distribution system (LMDS), and the Internet. The wireless wide area network may comprise at least one of a global system for mobile communications (GSM) network, a time division multiple access (TDMA) network, a code division multiple access (CDMA) network, and a universal mobile telecommunications system (UMTS) network. The plurality of access devices may comprise at least one of a mobile multimedia handset, a personal digital assistant (PDA), a personal computer (PC), and a wireless handset.

Further aspects of the present invention may be found in a method supporting simulcasting of wide area network calls via a broadband access gateway. The method may comprise exchanging, with a wireless wide area network via a broadband network, multimedia information concurrently exchanged wirelessly by the wireless wide area network with a first of a plurality of access devices, and establishing with a second of the plurality of access devices, via at least one wireless interface, a call path for exchange of the multimedia information. The method may also comprise exchanging the multimedia information with the second of the plurality of access devices, via the at least one wireless interface. The method may further comprise determining whether the first of the plurality of access devices is within a coverage area of the at least one wireless interface, and notifying the second of the plurality of access devices of the establishment of the call path for the exchange of multimedia information. The first and second of the plurality of access devices may be the same access device. A representative embodiment in accordance with the present invention may also comprise filtering multimedia information so as to be compatible with the second of the plurality of access devices.

Multimedia information in various representative embodiment of the present invention may comprise at least one of streaming video, broadcast video, voice, digital data, text, digitized audio, digitized still images, digitized video, and digitized music. The at least one wireless interface may be compliant with the Bluetooth V1.2 or compatible personal area network (PAN) specification, and may be compliant with at least one of the Institute of Electrical and Electronics Engineers (IEEE) 802.11a, 802.11b, 802.11g, and 802.11n standards. The at least one wireless interface comprises two wireless interfaces. The broadband network may comprise at least one of a digital subscriber line (DSL) network, a cable network, a satellite network, a local multipoint distribution system (LMDS), and the Internet. The wireless wide area network may comprise at least one of a global system for mobile communications (GSM) network, a time division multiple access (TDMA) network, a code division multiple access (CDMA) network, and a universal mobile telecommunications system (UMTS) network. The plurality of access devices may comprise at least one of a mobile multimedia handset, a personal digital assistant (PDA), a personal computer (PC), and a wireless handset.

Yet other aspects of the present invention may be observed in a machine-readable storage, having stored thereon a computer program having a plurality of code sections for operating a gateway supporting simulcasting of wireless wide area network calls via a broadband access gateway. The code sections may be executable by a machine for causing the machine to receive a request to establish call communication via a first path, and receive, from a wireless wide area network via the first path, multimedia information concurrently sent by the wireless wide area network to a first access device via a wireless second path. Such a representative embodiment of the present invention may also detect a presence of the first access device, may accept a request to establish call communication via a third path, and may transmit the received multimedia information to at least one of the first access device and a second access device via the third path. A representative embodiment of the present invention may also establish call communication via the first path, and may cause notification of a user of the access device, of call communication via the first path. In various representative embodiments of the present invention, multimedia information may comprise at least one of streaming video, broadcast video, voice, digital data, text, digitized audio, digitized still images, digitized video, and digitized music. The first path may comprise at least one of a digital subscriber line (DSL) network, a cable network, a satellite network, a local multipoint distribution system (LMDS), and the Internet. The second path may comprise at least one of a global system for mobile communications (GSM) network, a time division multiple access (TDMA) network, a code division multiple access (CDMA) network, and a universal mobile telecommunications system (UMTS) network. The third path may be compliant with at least one of the Institute of Electrical and Electronics Engineers (IEEE) 802.11a, 802.11b, 802.11g, and 802.11n standards. The access devices may comprise at least one of a mobile multimedia handset, a personal digital assistant (PDA), a personal computer (PC), and a wireless handset.

In a representative embodiment of the present invention, the wireless local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1xRT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineer (IEEE) 802.15.3a compliant wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are considerations because all the information coming into and leaving the home from either the WAN side (i.e., the broadband connection side), or from the PAN side (i.e., the access device side) converges at the gateway. The PAN side may comprise Bluetooth, wireless LAN (IEEE 802.11 a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway.

Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

In a representative embodiment of the present invention, an access device such as, for example, a mobile multimedia handset engaged in a call served by a wireless wide area network may migrate to within the coverage area of an associated broadband access gateway with a wireless interface. The wireless wide area network may simulcast call content to the broadband access gateway via a broadband network. A user in the proximity of the broadband access gateway may be notified of the simulcasting of the call, and may elect to continue the call via a WLAN/PAN-enabled wireless handset or other access device that is compatible with the wired and/or wireless interfaces of the broadband access gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system supporting simulcasting of a wide area network call via a broadband access gateway, the system comprising:

a gateway communicatively coupled to a broadband network and at least one wireless interface, the gateway operable to selectively communicate multimedia information among the at least one wireless interface and the broadband network, and to communicate with a plurality of access devices via the at least one wireless interface;

the gateway operable to receive from a wireless wide area network via the broadband network, multimedia information also received wirelessly by a first of the plurality of access devices via a simulcast transmission directly from the wireless wide area network, wherein the simulcast transmission to the gateway is initiated by the wireless wide area network according to user-established associations of the first of the plurality of access devices and the gateway and of the gateway to the wireless wide area network, known to the wireless wide area network;

the gateway operable to establish with a second of the plurality of access devices, via the at least one wireless interface, a call path for communication of the multimedia information to the second of the plurality of access devices; and the gateway operable to communicate the multimedia information to the second of the plurality of access devices, via the at least one wireless interface.

2. The system according to claim 1 further comprising:
the gateway operable to notify the second of the plurality of access devices of the establishment of the call path for the communication of multimedia information.

3. The system according to claim 1 wherein the first and second of the plurality of access devices are the same access device.

4. The system according to claim 1 further comprising:
the gateway operable to filter multimedia information so as to be compatible with the second of the plurality of access devices.

5. The system according to claim 1 wherein multimedia information comprises one or more of: streaming video, broadcast video, voice, digital data, text, digitized audio, digitized still images, digitized video, and/or digitized music.

6. The system according to claim 1 wherein the at least one wireless interface is compliant with the Bluetooth V1.2 or compatible personal area network (PAN) specification.

7. The system according to claim 1 wherein the at least one wireless interface is compliant with one or more of: the Institute of Electrical and Electronics Engineers (IEEE) 802.11a, 802.11b, 802.11g, and/or 802.11n standards.

8. The system according to claim 1 wherein the at least one wireless interface comprises two wireless interfaces.

9. The system according to claim 1 wherein the broadband network comprises one or more of: a digital subscriber line (DSL) network, a cable network, a satellite network, a local multipoint distribution system (LMDS), and/or the Internet.

10. The system according to claim 1 wherein the wireless wide area network comprises one or more of: a global system for mobile communications (GSM) network, a time division multiple access (TDMA) network, a code division multiple access (CDMA) network, and/or a universal mobile telecommunications system (UMTS) network.

11. The system according to claim 1 wherein the plurality of access devices comprises one or more of: a mobile multimedia handset, a personal digital assistant (PDA), a personal computer (PC), and/or a wireless handset.

12. The system according to claim 1 wherein the simulcast transmission to the gateway is initiated by the wireless wide area network using information about physical locations of the first of the plurality of access devices and the gateway.

13. The system according to claim 1 wherein the gateway causes the second of the plurality of access devices to periodically alert a user of the simulcasting of the multimedia information to the gateway.

14. The system according to claim 1 wherein the wireless wide area network causes the first of the plurality of access devices to periodically alert a user of the simulcasting of the multimedia information to the gateway.

15. A method supporting simulcasting of wide area network calls via a broadband access gateway, the method comprising:

receiving, from a wireless wide area network via a broadband network, multimedia information also received wirelessly by a first of a plurality of access devices via a simulcast transmission directly from the wireless wide area network, wherein the simulcast transmission to the gateway is initiated by the wireless wide area network according to user-established associations of the first of the plurality of access devices and the gateway and of the gateway and the wireless wide area network, known to the wireless wide area network;

establishing with a second of the plurality of access devices, via at least one wireless interface, a call path for communication of the multimedia information to the second of the plurality of access devices; and communicating the multimedia information to the second of the plurality of access devices, via the at least one wireless interface.

16. The method according to claim 15 further comprising:
notifying the second of the plurality of access devices of the establishment of the call path for the communication of multimedia information.

17. The method according to claim 15 wherein the first and second of the plurality of access devices are the same access device.

18. The method according to claim 15 further comprising:
filtering multimedia information so as to be compatible with the second of the plurality of access devices.

19. The method according to claim 15 wherein multimedia information comprises one or more of: streaming video, broadcast video, voice, digital data, text, digitized audio, digitized still images, digitized video, and/or digitized music.

20. The method according to claim 15 wherein the at least one wireless interface is compliant with the Bluetooth V1.2 or compatible personal area network (PAN) specification.

21. The method according to claim 15 wherein the at least one wireless interface is compliant with one or more of: the Institute of Electrical and Electronics Engineers (IEEE) 802.11a, 802.11b, 802.11g, and/or 802.11n standards.

22. The method according to claim 15 wherein the at least one wireless interface comprises two wireless interfaces.

23. The method according to claim 15 wherein the broadband network comprises one or more of: a digital subscriber line (DSL) network, a cable network, a satellite network, a local multipoint distribution system (LMDS), and/or the Internet.

24. The method according to claim 15 wherein the wireless wide area network comprises one or more of: a global system for mobile communications (GSM) network, a time division multiple access (TDMA) network, a code division multiple access (CDMA) network, and/or a universal mobile telecommunications system (UMTS) network.

25. The method according to claim 15 wherein the plurality of access devices comprises one or more of: a mobile multimedia handset, a personal digital assistant (PDA), a personal computer (PC), and/or a wireless handset.

26. The method according to claim 15 wherein the simulcast transmission to the gateway is initiated by the wireless wide area network using information about physical locations of the first of the plurality of access devices and the gateway.

27. The method according to claim 15 wherein the gateway causes the second of the plurality of access devices to periodically alert a user of the simulcasting of the multimedia information to the gateway.

28. The method according to claim 15 wherein the wireless wide area network causes the first of the plurality of access devices to periodically alert a user of the simulcasting of the multimedia information to the gateway.

29. A machine-readable storage, having stored thereon a computer program having a plurality of code sections for operating a gateway supporting simulcasting of wireless wide area network calls via a broadband network, the code sections executable by a machine for causing the machine to perform the operations comprising:

receiving a request to establish call communication via a first path;

receiving, at the gateway from a wireless wide area network via the first path, multimedia information also received by a first access device via a simulcast transmission directly from the wireless wide area network using a wireless second path, wherein simulcast transmission of the multimedia information to the gateway is initiated by the wireless wide area network according to user-defined associations of the first access device and the gateway and of the gateway and the wireless wide area network, known to the wireless wide area network;

accepting, at the gateway, a request to establish call communication via a third path; and transmitting the received multimedia information to one or both of: the first access device and/or a second access device via the third path.

30. The machine readable storage of claim 29 wherein the code sections executable by a machine further causing the machine to perform the operations comprising:
establishing call communication via the first path.

31. The machine readable storage of claim 29 wherein the code sections executable by a machine further causing the machine to perform the operations comprising:
causing notification of a user of the first access device, of call communication via the first path.

32. The machine-readable storage according to claim 29 wherein multimedia information comprises one or more of: streaming video, broadcast video, voice, digital data, text, digitized audio, digitized still images, digitized video, and/or digitized music.

33. The machine-readable storage according to claim 29 wherein the first path comprises one or more of: a digital subscriber line (DSL) network, a cable network, a satellite network, a local multipoint distribution system (LMDS), and/or the Internet.

34. The machine-readable storage according to claim 29 wherein the second path comprises one or more of: a global system for mobile communications (GSM) network, a time division multiple access (TDMA) network, a code division multiple access (CDMA) network, and/or a universal mobile telecommunications system (UMTS) network.

35. The machine-readable storage according to claim 29 wherein the third path is compliant with one or more of: the Institute of Electrical and Electronics Engineers (IEEE) 802.11a, 802.11b, 802.11g, and/or 802.11n standards.

36. The machine-readable storage according to claim 29 wherein the access devices comprise one or more of: a mobile multimedia handset, a personal digital assistant (PDA), a personal computer (PC), and/or a wireless handset.

37. The machine-readable storage according to claim 29 wherein the simulcast transmission to the gateway is initiated by the wireless wide area network using information about physical locations of the first access device and the gateway.

38. The machine-readable storage according to claim 29 wherein the gateway causes an access device to periodically alert a user of the simulcasting of the multimedia information to the gateway.

39. The machine-readable storage according to claim 29 wherein the wireless wide area network causes the first access device to periodically alert a user of the simulcasting of the multimedia information to the gateway.

40. A system supporting simulcasting of a wide area network call via a broadband access gateway, the system comprising:
at least one processor operably coupled to at least one wireless interface and to a broadband network, the at least one processor operable to, at least:
receive from a wireless wide area network via the broadband network, multimedia information also received wirelessly by a first of a plurality of access devices via a simulcast transmission directly from the wireless wide area network, wherein the simulcast transmission to the gateway is initiated by the wireless wide area network according to user-defined associations of the first of the plurality of access devices and the gateway and of the gateway and the wireless wide area network, known to the wireless wide area network;
establish with a second of the plurality of access devices, via the at least one wireless interface, a call path for communication of the multimedia information to the second of the plurality of access devices; and
communicate the multimedia information to the second of the plurality of access devices, via the at least one wireless interface.

41. The system according to claim 40 wherein the at least one processor is operable to, at least:
notify the second of the plurality of access devices of the establishment of the call path for the communication of multimedia information.

42. The system according to claim 40 wherein the first and second of the plurality of access devices are the same access device.

43. The system according to claim 40 wherein the at least one processor is operable to, at least:
filter multimedia information so as to be compatible with the second of the plurality of access devices.

44. The system according to claim 40 wherein multimedia information comprises one or more of: streaming video, broadcast video, voice, digital data, text, digitized audio, digitized still images, digitized video, and/or digitized music.

45. The system according to claim 40 wherein the at least one wireless interface is compliant with the Bluetooth V1.2 or compatible personal area network (PAN) specification.

46. The system according to claim 40 wherein the at least one wireless interface is compliant with one or more of: the Institute of Electrical and Electronics Engineers (IEEE) 802.11a, 802.11b, 802.11g, and/or 802.11n standards.

47. The system according to claim 40 wherein the at least one wireless interface comprises two wireless interfaces.

48. The system according to claim 40 wherein the broadband network comprises one or more of: a digital subscriber line (DSL) network, a cable network, a satellite network, a local multipoint distribution system (LMDS), and/or the Internet.

49. The system according to claim 40 wherein the wireless wide area network comprises one or more of: a global system for mobile communications (GSM) network, a time division multiple access (TDMA) network, a code division multiple access (CDMA) network, and/or a universal mobile telecommunications system (UMTS) network.

50. The system according to claim 40 wherein the plurality of access devices comprises one or more of: a mobile multimedia handset, a personal digital assistant (PDA), a personal computer (PC), and/or a wireless handset.

51. The system according to claim 40 wherein the simulcast transmission to the gateway is initiated by the wireless wide area network using information about physical locations of the first of the plurality of access devices and the gateway.

52. The system according to claim 40 wherein the gateway causes the second of the plurality of access devices to periodically alert a user of the simulcasting of the multimedia information to the gateway.

53. The system according to claim 40 wherein the wireless wide area network causes the first of the plurality of access devices to periodically alert a user of the simulcasting of the multimedia information to the gateway.

* * * * *